(12) United States Patent
Kudo et al.

(10) Patent No.: US 7,493,382 B2
(45) Date of Patent: *Feb. 17, 2009

(54) RESOURCE ASSIGNMENT MANAGER AND RESOURCE ASSIGNMENT METHOD

(75) Inventors: Yutaka Kudo, Yokohama (JP); Futoshi Haga, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 526 days.

This patent is subject to a terminal disclaimer.

(21) Appl. No.: 11/286,194

(22) Filed: Nov. 22, 2005

(65) Prior Publication Data

US 2006/0218243 A1 Sep. 28, 2006

(30) Foreign Application Priority Data

Mar. 28, 2005 (JP) ............................. 2005-090980
Aug. 29, 2005 (JP) ............................. 2005-246990

(51) Int. Cl.
G06F 15/173 (2006.01)
G06F 15/177 (2006.01)

(52) U.S. Cl. ...................... 709/223; 709/220; 709/224

(58) Field of Classification Search ................. 709/220, 709/223–224

See application file for complete search history.

(56) References Cited

U.S. PATENT DOCUMENTS 5,799,173 A * 8/1998 Gossler et al. ............... 703/21
6,425,007 B1 * 7/2002 Messinger .................. 709/224
7,080,378 B1 * 7/2006 Noland et al. ............... 718/104

2005/0021530 A1 * 1/2005 Garg et al. .................. 707/100
2005/0102398 A1 * 5/2005 Zhang et al. ................ 709/225
2005/0193113 A1 * 9/2005 Kokusho et al. ............ 709/225

FOREIGN PATENT DOCUMENTS

JP 2001331332 11/2001

* cited by examiner

*Primary Examiner*—Ario' Etienne
*Assistant Examiner*—Hussein Elchanti
(74) *Attorney, Agent, or Firm*—Townsend and Townsend and Crew LLP

(57) ABSTRACT

In a system in which requests to an application are distributed to computers on which the application in question is executed, computers are managed so as to prevent lowering of the service level of each application.

A resource assignment manager 1 manages specifications of server computers 3. Further, the resource assignment manager 1 manages, for each application, correspondence between specifications of a server computer 3 and the number of processed requests in the case where the application in question is executed on a server computer 3 having those specifications. For each application, the resource assignment manager 1 monitors the number of received requests and the number of processed requests on server computers 3 to which the application in question, to specify an application deficient in resources. Then, the resource assignment manager 1 determines server computers 3 that are assigned additionally to the specified application, based on the required resource amount for the specified application, specifications of each of pooled server computers 3, and the correspondence between specifications of a server computer 3 and the number of processed requests expected when the specified application is executed on a server computer 3 having those specifications.

20 Claims, 13 Drawing Sheets

FIG. 2

APPLICATION CONFIGURATION MANAGEMENT TL 131

| APPLICATION ID | SERVICE TYPE | FUNCTION | MODULE ID | MULTIPLEXING |
|---|---|---|---|---|
| APP_01 | Web SHOPPING | Web SERVER | WEB_01 | POSSIBLE |
| APP_01 | Web SHOPPING | DATABASE | DB_01 | IMPOSSIBLE |
| APP_02 | CATALOG DISTRIBUTION ON Web | Web SERVER | WEB_02 | POSSIBLE |
| APP_03 | CATALOG DISTRIBUTION ON Web | Web SERVER | WEB_03 | POSSIBLE |
| ⋮ | ⋮ | ⋮ | ⋮ | ⋮ |

FIG. 3

RESOURCE MANAGEMENT TL 132

| COMPUTER ID | SPECIFICATION INFORMATION | | | APPLICATION ID | MODULE ID |
|---|---|---|---|---|---|
| | CPU NAME | CPU FREQUENCY | MEMORY CAPACITY | | |
| M_001 | A | 866[MHz] | 1024[Mbyte] | APP_01 | WEB_01 |
| M_002 | A | 866[MHz] | 1024[Mbyte] | APP_01 | WEB_01 |
| M_003 | A | 2200[MHz] | 1024[Mbyte] | APP_01 | WEB_01 |
| M_004 | B | 3000[MHz] | 1024[Mbyte] | APP_01 | DB_01 |
| ⋮ | ⋮ | ⋮ | ⋮ | ⋮ | ⋮ |
| M_096 | A | 3000[MHz] | 1024[Mbyte] | NON-ASSIGNED | NON-ASSIGNED |
| M_097 | A | 3000[MHz] | 1024[Mbyte] | NON-ASSIGNED | NON-ASSIGNED |
| M_098 | A | 3000[MHz] | 1024[Mbyte] | NON-ASSIGNED | NON-ASSIGNED |
| M_099 | A | 1500[MHz] | 1024[Mbyte] | NON-ASSIGNED | NON-ASSIGNED |
| M_100 | A | 1500[MHz] | 1024[Mbyte] | NON-ASSIGNED | NON-ASSIGNED |

FIG. 4

METRIC INFORMATION MANAGEMENT TL 133

| COMPUTER ID 1331 | APPLICATION ID 1332 | MODULE ID 1333 | METRIC INFORMATION 1334 | | | REGISTRATION DATE AND TIME 1335 |
|---|---|---|---|---|---|---|
| | | | NUMBER OF RECEIVED REQUESTS (NUMBER/MINUTE) 13341 | NUMBER OF PROCESSED REQUESTS (NUMBER/MINUTE) 13342 | CPU UTILIZATION (%) 13343 | |
| M_001 | APP_01 | WEB_01 | 1000 | 400 | 70 | 2005/3/15/17:00 |
| M_002 | APP_01 | WEB_01 | 1000 | 400 | 65 | 2005/3/15/17:10 |
| M_003 | APP_01 | WEB_01 | 2000 | 600 | 79 | 2005/3/15/17:15 |
| M_004 | APP_01 | DB_01 | 1400 | 1400 | 55 | 2005/3/15/17:20 |
| ... | ... | ... | ... | ... | ... | ... |

1330

PROCESSING CAPACITY MANAGEMENT TL 134

| APPLICATION ID | MODULE ID | SPECIFICATION INFORMATION | | | PROCESSING CAPACITY (NUMBER/MINUTE) |
|---|---|---|---|---|---|
| | | CPU NAME | CPU FREQUENCY | MEMORY CAPACITY | |
| APP_01 | WEB_01 | A | 866[MHz] | 512[Mbyte] | 300 |
| APP_01 | WEB_01 | A | 866[MHz] | 1024[Mbyte] | 400 |
| APP_01 | WEB_01 | A | 2200[MHz] | 1024[Mbyte] | 600 |
| APP_01 | WEB_01 | A | 3000[MHz] | 1024[Mbyte] | 700 |
| ⋮ | ⋮ | ⋮ | ⋮ | ⋮ | ⋮ |

FIG. 13

SPECIFICATION CONVERSION TL 137

| SERVICE TYPE | BENCH ID | SPECIFICATION INFORMATION | | PROCESSING CAPACITY (NUMBER/MINUTE) |
| --- | --- | --- | --- | --- |
| | | CPU NAME | CPU FREQUENCY | MEMORY CAPACITY | |
| Web SHOPPING | AAA | A | 866[MHz] | 1024[Mbyte] | 700 |
| Web SHOPPING | AAA | A | 1500[MHz] | 1024[Mbyte] | 800 |
| Web SHOPPING | AAA | A | 2200[MHz] | 1024[Mbyte] | 1100 |
| Web SHOPPING | AAA | A | 3000[MHz] | 1024[Mbyte] | 1300 |
| · · · | · · · | · · · | · · · | · · · | · · · |

RESOURCE ASSIGNMENT MANAGER AND RESOURCE ASSIGNMENT METHOD

CLAIM OF PRIORITY

The present application claims priority from Japanese Patent Application P2005-090980 filed on Mar. 28, 2005 and Japanese Patent Application P2005-246990 filed on Aug. 29, 2005, the contents of which are hereby incorporated by reference into this application.

FIELD OF THE INVENTION

The present invention relates to a technique of determining computers assigned to a desired application out of a plurality of computers.

BACKGROUND OF THE INVENTION

Recently, the Internet has been widely utilized for using some applications. Among others, a business application is conventionally used in a system having a fixed number of terminals. When, however, the Internet is utilized, it is difficult to estimate the number of terminals and the number of requests.

Thus, is desired a technique of increasing the number of computers on which an application is executed depending on, for example, the number of requests, to distribute the load and thus to improve the response to a request and to improve the operation stability.

For example, now is required a technique of holding (pooling) many computers that can be assigned to various applications without fixing relations between applications and the computers executing the applications, in order to assign and activate a required amount of computer resources for a certain application when necessary.

Patent Document 1 (Japanese Non-examined Patent Laid-Open No. 2001-331332) discloses a technique of reserving a certain resource for a real time application system. This technique previously stores, in a database, correspondence between a service level and respective resource amounts of a processor, a memory and a disk bandwidth, and determines and reserves resource amounts assigned to an application based on the resources associated with a requested service level. According to this technique, it is possible to reserve resources easily without designating complex parameters and to prevent a wasteful use of resource amounts occurring from reservation of resource amounts.

In a data center, there is constructed a system in which each of a plurality of applications (for example, Web service programs) is executed on at least one of a plurality of computers, and requests to an application are distributed to and processed by the computer(s) on which that application is executed.

In such a system, computers to which no application is assigned are pooled, and then, one or some of the pooled computers are assigned to an application having many requests to be processed to run the application on the assigned computer(s), increasing a resource amount (i.e., computers) assigned to that application having many requests to be processed.

This arrangement prevents lowering of the service level of that application having many requests to be processed. Here, the service level means a level of service provided from a service provider to a service user, and indicated, for example, by a time elapsing from transmission of a request by a terminal of a service user until a return of a result of the request to the terminal of the service user. The technique described in the above Patent Document 1 can be applied to assignment of resources (computers) to applications in the above-described system. However, the technique described in the above Patent Document 1 does not take the following points into consideration.

(1) The number of requests allowable for a computer of certain specifications varies depending on an application.
(2) All the pooled computers do not have the same specifications.
(3) Sometimes, it is necessary to assign a computer whose specifications are unknown to an application to which that computer should be assigned.

Thus, it is difficult to perform efficient resource assignment (causing neither resource deficiency nor assignment of excessive resources) by applying the technique described in the above Patent Document 1 to assignment of resources (computers) to applications, in a system in which each of a plurality of applications is executed at least one of a plurality of computers and requests to an application are distributed to and processed by computers on which that application is executed.

SUMMARY OF THE INVENTION

The present invention has been made considering the above situation. And, an object of the present invention is to manage computers assigned to each application such that the service level of each application can be prevented from lowering, in a system in which requests to an application are distributed to and processed by computers on which that application is executed.

To solve the problem, according to the present invention, specifications of each of pooled computers are managed. Further, for each application, correspondence between specifications of a computer and the number of processed requests per unit of time, which can be expected when the application in question is executed on a computer having the specifications, is managed. Then, for each application, the number of received requests per unit of time and the number of processed requests per unit of time for each of computers to which the application in question is allocated are monitored, to specify an application for which processing does not catch up with requests (resources are deficient). Then, computers assigned additionally to the specified application are determined out of the pooled computers, based on a difference between the number of requests per unit of time to the specified application and the number of processed requests, the specifications of each of the pooled computers, and the correspondence between specifications of a computer and the number of processed requests per unit of time that can be expected when the specified application is executed on a computer having those specifications.

For example, the present invention provides a resource assignment manager that determines computers on which an application is newly executed out of pooled computers in a system in which each of a plurality of applications is executed on at least one of a plurality of computers and requests to an application are distributed to and processed by computers on which said application is executed, comprising:

a specification information storage means, which stores specification information of each of said pooled computers;

a processing capacity storage means, which stores, for each of said plurality of applications, correspondence between specification information of a computer and a number of processed requests per unit of time, said number being expected when the application in question is executed on a computer having said specification information;

a required resource amount estimation means, which specifies, for each of said plurality of applications, an application deficient in resources based on a difference between a number of received requests per unit of time and a number of processed requests per unit of time in each of computers assigned to the application in question, and determines said difference (number of requests) as a required resource amount for said application specified as one deficient in resources; and a configuration change means, which determines computers required for processing the required resource amount estimated by said required resource amount estimation means, out of said pooled computers, based on the specification information (stored in said specification information storage means) of each of said pooled computers and based on the correspondence (stored in said processing capacity storage means) between the specification information of a computer and the number of processed requests per unit of time, said number being expected when the application in question is executed on a computer having said specification information.

According to the present invention, it is possible to manage computers assigned to each application so as to prevent lowering of the service level of each application.

BRIEF DESCRIPTION OF THE DRAWINGS

FIG. 2 is a schematic diagram showing an application configuration management TL 131;

FIG. 3 is a schematic diagram showing a resource management TL 132;

FIG. 4 is a schematic diagram showing a metric information management TL 133;

FIG. 13 is a schematic diagram showing a specification conversion TL 137;

DESCRIPTION OF THE PREFERRED EMBODIMENTS

Now, embodiments of the present invention will be described.

Figure 1:
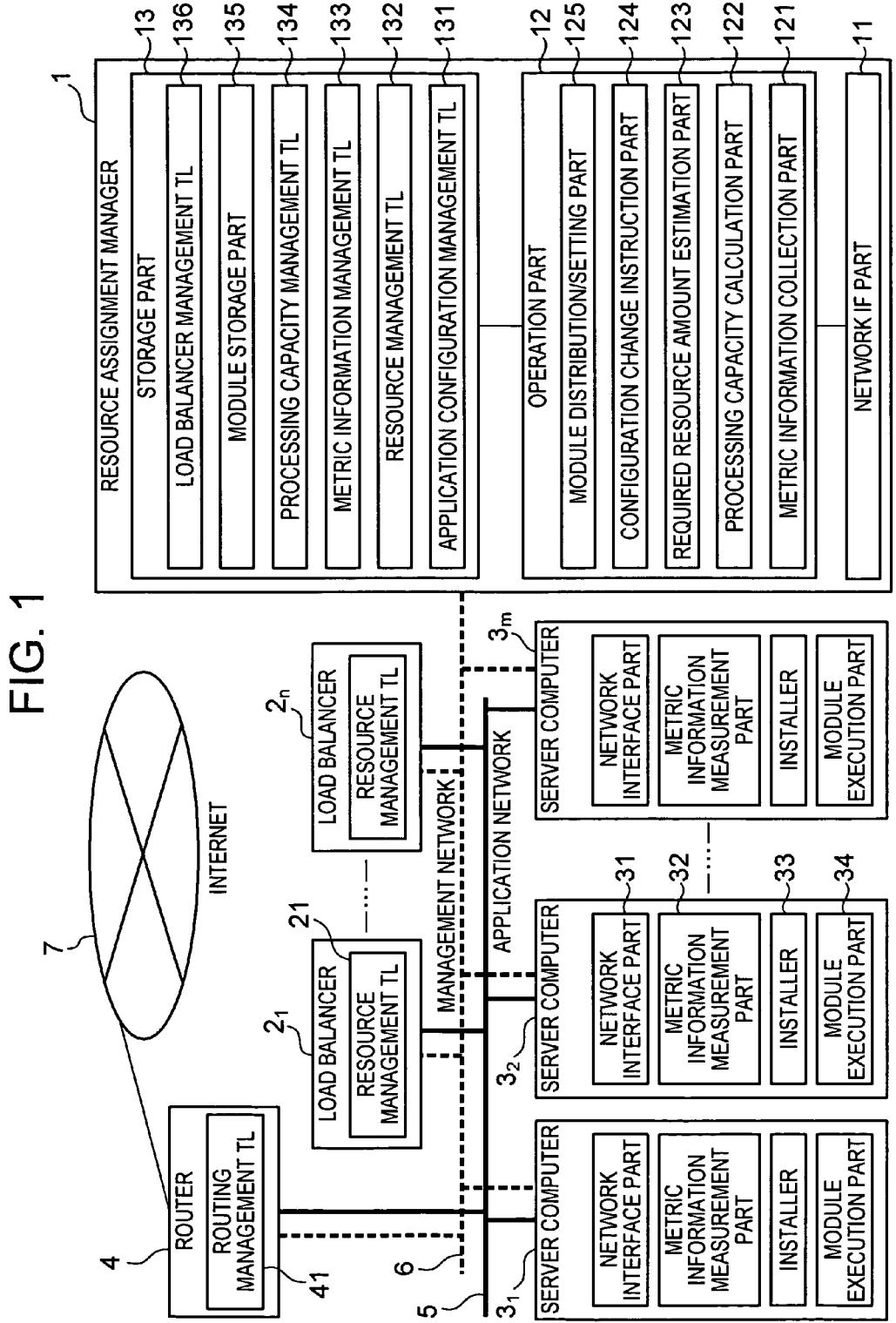
FIG. 1 is a schematic diagram showing a resource assignment management system to which one embodiment of the invention is applied.

FIG. 1 is a schematic diagram showing a resource assignment management system to which one embodiment of the invention is applied.

As shown in the figure, the resource assignment management system of the present embodiment comprises a resource assignment manager 1, a plurality of load balancers $2_1$-$2_n$ (hereinafter, also simply referred to as load balancer(s) 2), a plurality of server computers $3_1$-$3_m$ (hereinafter, also simply referred to as server computer(s) 3), and a router 4 connected to the Internet 7.

The resource assignment manager 1, the load balancers 2, the server computers 3 and the router 4 are connected with one another through each of an application network 5 and a management network 6. The application network 5 is a network used by a server computer 3 for providing a service of an application to a client terminal (not shown) connected to the Internet 7. And, the management network 6 is a network used by the resource assignment manager 1 for maintenance and management of the load balancers 2, the server computers 3 and the router 4. The application network 5 and the management network 6 may be constructed as physically different networks using different cables, or as logically different networks implemented on the same cable.

For each load balancer 2, the router 4 has a routing TL (table) 41 that stores correspondence between a global IP address and a local IP address. The router 4 sends a request, which is received from a client terminal (not shown) through the Internet, to a load balancer 2 that has the local IP address corresponding to the global IP address designated as the destination of the request, according to the routing TL. Further, the router 4 receives a processing result of that request from the load balancer 2, and sends the processing result to the client terminal (not shown), i.e., the sender of the request, through the Internet 7. Other functions of the router 4 are same as ones of a conventional router, and their detailed description will be omitted here.

A load balancer 2 and at least one of the server computers 3 constitute a load balancing (scale out) system for an application. A load balancer 2 has a resource management TL 21 that registers information on server computers 3 that the load balancer itself can use. A load balancer 2 sends a request received from the router 4 to a server computer 3 whose load is lower among the server computers 3 registered in the resource management TL 21, so that the request is processed by that server computer 3. Further, a load balancer 2 receives a result of processing a request, from a server computer 3 registered in the resource management TL 21, through the application network 5, and sends the processing result to the sender of the request through the router 4. Further, a load balancer 2 updates the resource management TL 21 according to an instruction received from the resource assignment manager 1 through the management network 6. Other functions of a load balancer 2 are same as a load balancer used in a conventional load balancing system, and their detailed description is omitted here.

A server computer 3 processes a request received through the application network 5, according to a module PG (program) under execution, and sends a processing result to the load balancer 2 or other server computers 3 that constitute a load balancing system together with the server computer 3 in question. Further, a server computer 3 activates (stops) a designated module PG according to an instruction received from the resource assignment manager 1 through the management network 6. An application comprises at least one module PG.

As shown in the figure, a server computer 3 comprises a network IF (interface) part 31 for connecting to the application network 5 and the management network 6, a metric information measurement part 32, an installer 33 and a module execution part 34.

The metric information measurement part 32 measures metric information of its own server computer 3, and sends the metric information to the resource assignment manager 1 through the management network 6. In the present embodiment, as the metric information, are measured the number of requests received per unit of time from the application network 5 (the number of received requests), the number of requests outputted per unit of time to the application network 5 (the number of processed requests), and a CPU utilization. The metric information measurement part 32 sends the measured metric information together with a computer ID (for example, the local address) as the identification information of its own server computer 3 to the resource assignment manager 1 through the management network 6.

The installer 33 makes the module execution part 34 execute a module PG designated by the resource assignment manager 1, according to an instruction received from the resource assignment manager 1 through the management network 6.

Then, the module execution part 34 executes the module PG according to the instruction from the installer 33. As a result, the module execution part 34 processes a request, which is received through the application network 6, according to an application under execution, and sends the result through the application network to the load balancer 2 or other server computers 3 that constitute a load balancing system together with the server computer 3 of the module execution part 34 itself.

Other functions of a server computer 3 are same as a server computer used in a conventional load balancing system, and their detailed description is omitted here.

For each application, the resource assignment manager 1 monitors the metric information of each server computer 3 executing a module PG of that application, to detect an application for which processing does not keep up with requests (i.e., resources are deficient). When an application deficient in resources is detected, one of the pooled server computers 3 (executing no module PG) is assigned additionally to that application, to make the server computer 3 execute a module PG of that application.

As shown in the figure, the resource assignment manager 1 comprises a network IF part 11 for connecting to the application network 5 and the management network 6, an operation part 12, and a storage part 13.

The storage part 13 comprises an application configuration management TL 131, a resource management TL 132, a metric information management TL 133, a processing capacity management TL 134, a module storage part 135, and a load balancer management TL 136.

The application configuration management TL 131 stores information on modules constituting each application. FIG. 2 is a schematic diagram showing the application configuration management TL 131. As shown in the figure, the application configuration management TL 131 registers a record 1310 for each module PG. Each record 1310 comprises: a field 1311 for registering an application ID, i.e., identification information of an application that includes the module PG concerned; a field 1312 for registering a service type showing the type of service provided by that application; a field 1313 for registering a function provided by that module PG; a field 1314 for registering a module ID, i.e., identification information of that module PG; and a field 1315 for registering whether the module PG can be executed by a plurality of server computers 3 in parallel, i.e., whether multiplexing is possible or not.

The resource management TL 132 stores, for each server computer 3 (i.e., resource), information of specifications of that server computer 3 and a module PG under execution. FIG. 3 is a schematic diagram showing the resource management TL 132. As shown in the figure, the resource management TL 132 registers a record 1320 for each server computer 3. Each record 1320 comprises: a field 1321 for registering a computer ID, i.e., identification information of the server computer 3 as the target of the record; a field 1322 for registering specification information of that server computer 3; a field 1324 for registering an application ID of an application to which that server computer 3 is assigned; and a field 1325 for registering a module ID of a module PG that is running on that server computer 3. In the present embodiment, as the specification information, are used CPU name, CPU frequency and Memory capacity installed. Accordingly, the field 1322 has a subfield 13221 for registering CPU name, a subfield 13222 for registering CPU frequency, and a subfield 13223 for registering Memory capacity installed. In a record 1320 for a pooled server computer 3, the fields 1324 and 1325 register "non-assigned", which indicates that a module PG has not been assigned yet.

The metric information management TL 133 stores metric information received from each server computer 3 that is executing a module PG. FIG. 4 is a schematic diagram showing the metric information management TL133. As shown in the figure, the metric information management TL 133 registers a record 1330 for each server computer 3. Each record 1330 comprises: a field 1331 for registering a computer ID of the server computer 3 as the target of the record; a field 1322 for registering an application ID of an application to which that server computer 3 is assigned; a field 1333 for registering a module ID of a module PG that is running on that server computer 3; a field 1334 for registering metric information measured in that server computer 3; and a field 1335 for registering the date and time of registration of the record 1330. In the present embodiment, as the metric information, are measured the number of requests received per unit of time from the application network 5 (the number of received requests), the number of requests outputted per unit of time to the application network 5 (the number of processed requests), and a CPU utilization. Accordingly, the field 1334 has a subfield 13341 for registering the number of received requests (the number of requests/minute), a subfield 13342 for registering the number of processed requests (the number of requests/minute) and a subfield 13343 for registering a CPU utilization (%).

Figures 5, 6:
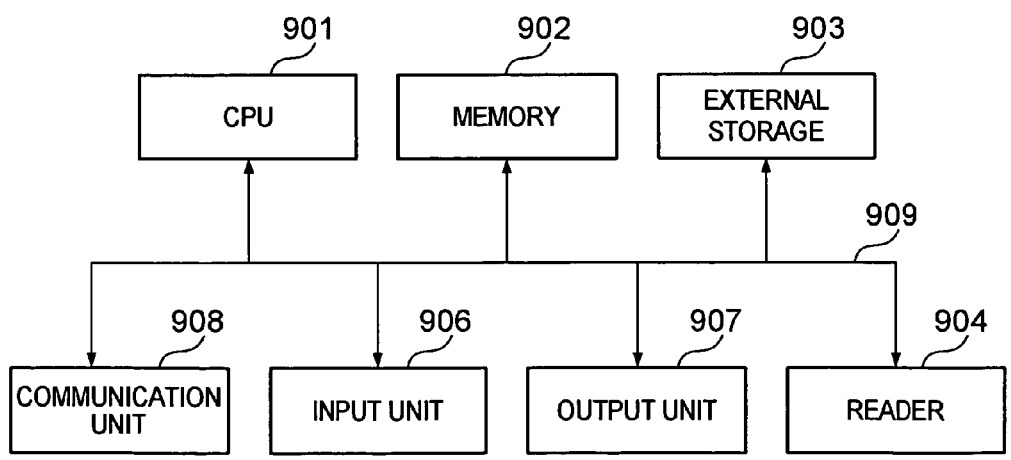
FIG. 5 is a schematic diagram showing a processing capacity management TL 134.
FIG. 6 is a diagram showing an example of hardware configuration of a resource assignment manager 1.

The processing capacity management TL 134 stores processing capacity for each module PG and for each set of specifications of a server computer 3 in the case where that module PG is executed on a server computer 3 having that set of specifications. FIG. 5 is a schematic diagram showing the processing capacity management TL 134. As shown in the figure, the processing capacity management TL 134 registers a record 1340 for each combination of a module PG and specifications of a server computer 3. Each record 1340 comprises: a field 1341 for registering an application ID of an application that includes the module PG concerned; a field

1342 for registering a module ID of that module PG; a field 1343 for registering specification information; and a field 1344 for registering processing capacity. In the present embodiment, as the specification information, are used CPU name, CPU frequency and Memory capacity installed. Accordingly, the field 1343 has a subfield 13431 for registering CPU name, a subfield 13432 for registering CPU frequency, and a subfield 13433 for registering Memory capacity installed. Further, in the present embodiment, as the processing capacity, is used the number of processed requests (one component of the metric information) measured in the case where the module PG in question is executed by a server computer 3 having the specification information registered in the field 1343.

In the module storage part 135, each module PG is registered in association with its module ID and an application ID of an application that includes the module PG.

The load balancer management TL 136 stores, in association with each application ID, a load balancer ID (for example, a local address) as identification information of a load balancer 2 that processes the application having the application ID in question.

The operation part 12 comprises a metric information collection part 121, a processing capacity calculation part 122, a required resource amount estimation part 123, a configuration change instruction part 124, and a module distribution/setting part 125.

The metric information collection part 121 receives metric information through the management network 6 from each server computer 3 that is executing a module PG, and updates the metric information management TL 133 based on the received metric information. In detail, when metric information is received from a server computer 3, the metric information collection part 121 searches the resource management TL 132 for a record 1320 having the computer ID of that server computer 3. Next, the metric information collection part 121 adds a new record 1330 to the metric information management TL 133, and registers the computer ID of that server computer 3, the application ID and module ID registered in the record 1320 retrieved from the resource management TL 132, and the metric information received from that server computer 3, together with the registration date and time, into the added record 1330.

Using the metric information management TL 133, the processing capacity calculation part 122 calculates processing capacity for a module PG in the case where that module PG is executed in a server computer 3 having a set of specifications, for each module PG and for each set of specifications of a server computer 3. Then, the calculation result is used to update the processing capacity management TL 134.

Using the metric information management TL 133, the required resource amount estimation part 123 estimates a resource amount deficient for executing a module PG, for each module PG. In the present embodiment, the deficient resource amount is expressed by the number of requests that are desired to be processed in addition.

For a module PG for which the deficient resource amount is estimated by the required resource amount estimation part 123, the configuration change instruction part 124 selects server computers 3 that should be additionally assigned to that module PG, out of the pooled server computers 3.

Then, from the module storage part 135, the module distribution/setting part 125 reads the module PG for which the deficient resource amount is estimated by the required resource amount estimation part 123. The module distribution/setting part 125 sends the read module PG to each of the server computers 3 selected for that module PG by the configuration change instruction part 124, through the management network 6, to make those server computers 3 execute the module PG. Further, the module distribution/setting part 125 accesses the load balancer 2 through the network 6 to update the information (which is registered in the resource management TL 21) on the server computers 3 that execute the module PG in question.

The resource assignment manager 1 having the above-described configuration can be implemented by an ordinary computer comprising, as shown in FIG. 6 for example, a CPU 901, a memory 902, an external storage 903 such as a HDD, a reader 904 for reading data from a storage medium such as a CD-ROM, a DVD-ROM, or an IC card, an input unit 906 such as a keyboard and a mouse, an output unit 907 such as a monitor and a printer, a communication unit 908 for connecting to the management network 6, and a bus 909 for connecting these components, when a program loaded onto the memory 902 is executed by the CPU 901. This program may be transferred from a storage medium through the reader or from the management network 6 through the communication unit 908 to the external storage 903, and then loaded onto the memory 902 to be executed by the CPU 901. Or, this program may be directly loaded onto the memory 902 without through the external storage 903, and executed by the CPU 901. In that case, the memory 902 or a storage medium mounted on the external storage 903 or the reader is used as the storage part 13. Further, the communication unit 908 is used as the network IF part 11.

Figure 15:
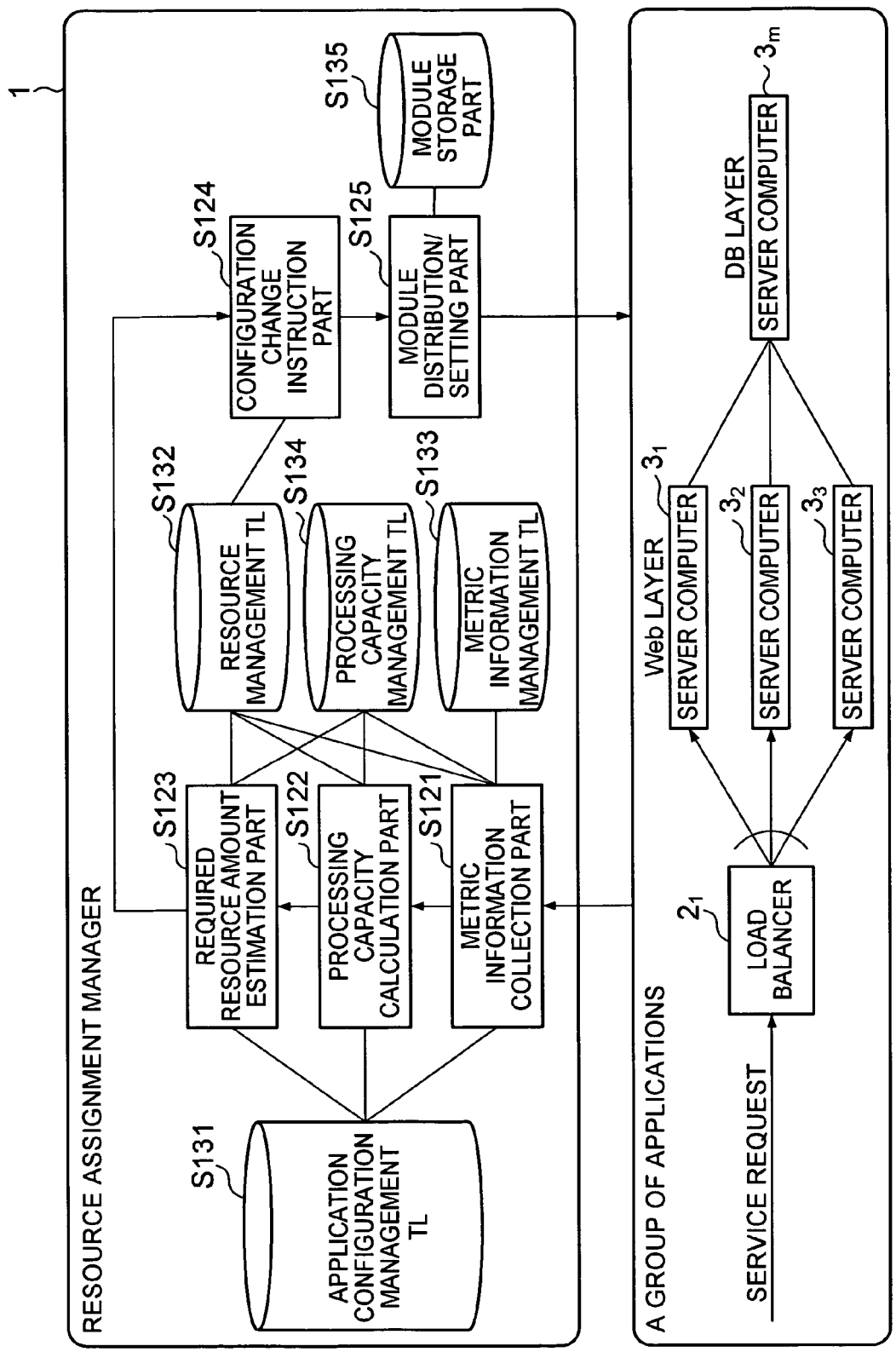
FIG. 15 is a functional block diagram showing the configuration of FIG. 1, dividing the configuration into a management part and an application part.

FIG. 15 is a functional block diagram showing the configuration of FIG. 1 according to the present invention, dividing the configuration into a management part and an application part, which will be now described.

In the resource assignment manager 1, the metric information collection part 121 collects/measures the metric information such as the number of received requests, the number of processed requests and a CPU utilization from apparatuses, such as the load balancer $2_1$ and a computer groups, i.e., server computers $3_1$-$3_m$ that are executing an application, and records the collected/measured metric information in the metric information management TL (table) 133.

Based on data such as various kinds of metric information and the identifier of an application in question recorded in the application configuration management TL 131 and computer specification information recorded in the resource management TL 132, the processing capacity calculation part 122 calculates the processing capacity achievable in the case where the application is executed in a computer having the specification, and records the calculated processing capacity in the processing capacity management TL 134. At that time, the processing capacity management TL 134 records the calculated processing capacity in a form indicating that a certain processing capacity can be stably attained when a certain application is executed on a computer having certain specifications.

When there is collected information indicating that a certain metric exceeds an assumed value and an application is executed in a state that stable execution can not be expected, then computer resources for executing the application are added (server computers on which an OS has been installed and is running are added, and the application is installed onto these server computers to be executed on these server computers) to control the system so that the load per computer decreases.

The required resource amount estimation part 123 determines the required resource amount that should be added to the system. The required resource amount may be simply a difference between the number of requests received per unit of time and the number of processed requests. Or, the required resource amount may be a difference between the number of requests received per unit of time and the number of requests processable (the appropriate number of requests processed, which can realize stable operation) recorded in the processing capacity management TL.

The resource management TL 132 records identifiers and specification information of the pooled computers. Based on the information recorded in the resource management TL 132 and the computer specification information recorded in the processing capacity management TL 134 and processing capacities that can be expected when a certain application is executed on computers having those specifications, the configuration change instruction part 124 instructs addition of computer resources (which corresponds to the required resource amount determined by the required resource amount estimation part 123) to the system out of the pooled computers.

The module distribution/setting part 125 acquires the application from the module storage part 135, installs the application onto the computers (addition of which has been instructed by the configuration change instruction part 124), and instructs setting of the load balancer.

Next, will be described operation of the resource assignment manager 1 having the above-described configuration.

Figure 7:
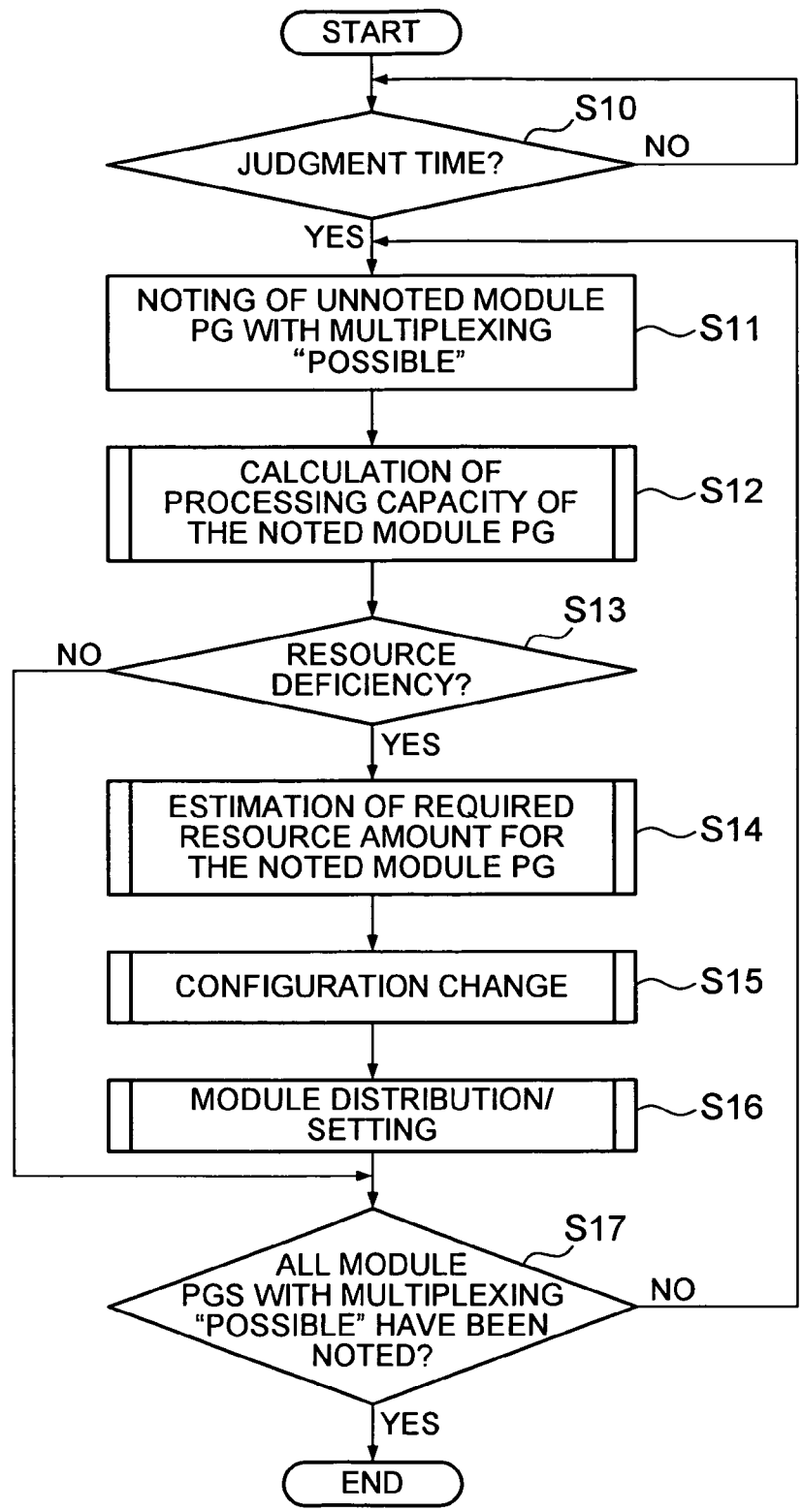
FIG. 7 is a flowchart for explaining operation of the resource assignment manager 1.

FIG. 7 is a flowchart for explaining operation of the resource assignment manager 1. Although not shown in this flowchart, the metric information collection part 121 always receives metric information from each server computer 3 through the management network 6 and updates the metric information management TL 133 based on the received metric information, as described above.

In FIG. 7, when the operation part 12 detects a point of time for judging resource assignment (such as elapse of a certain time period or arrival of a certain time) using a built-in timer not shown, or when the operation part 12 receives a resource assignment judgment instruction from a user through an input device not shown (YES in S10), then the operation part 12 specifies a record 1310 that has not been noted among records 1310 whose field 1315 registers "possible" with respect to multiplexing in the application configuration management TL 131, and determines this record 1310 as a noted record (S11). Then, the operation part 12 notifies the processing capacity calculation part 122 of this noted record.

Receiving the noted record, the processing capacity calculation part 122 calculates the processing capacity for each set of specifications of a server computer 3 with respect to a module PG having the module ID that is registered in the noted record, using the metric information management TL 133. Then, using the calculation results, the processing capacity calculation part 122 updates the processing capacity management TL 134 (S12).

Figure 8:
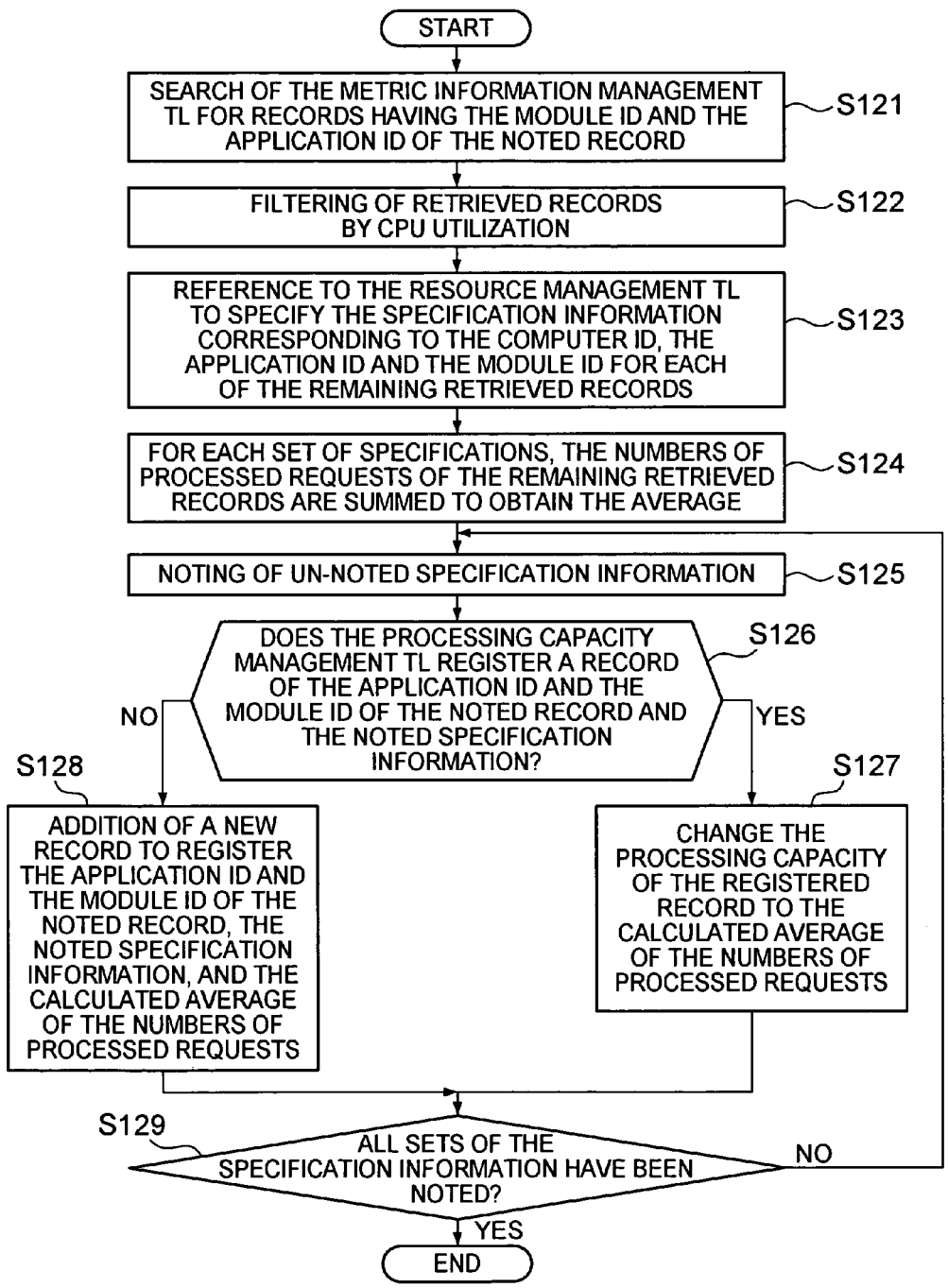
FIG. 8 is a flowchart for explaining operation in S12 (processing capacity calculation process) of FIG. 7.

FIG. 8 is a flowchart for explaining the operation in S12 (processing capacity calculation process) of FIG. 7.

First, the processing capacity calculation part 122 detects records 1330 having the application ID and the module ID registered in the noted record 1310 from the metric information management TL 133 (S121). Next, the processing capacity calculation part 122 filters the detected records 1330, using the CPU utilization registered in the subfield 13343 of each detected record 1330 (S122). When the CPU utilization is lower, it is more possible that the server computer 3 can process requests more than the number of processed requests registered in the metric information. On the other hand, when the CPU utilization is higher, it is more possible that the server computer 3 is not catching up with requests. It is considered accordingly that, in these cases, the number of processed requests does not indicate the real capacity of the server computer 3 concerned. Thus, in the present embodiment, filtering is performed such that records 1330 whose CPU utilization is other than 60-80% are removed from the objects of the calculation of the processing capacity.

If there remain a plurality of records 1330 having the same computer ID, the same application ID and the same module ID, then filtering is further performed such that the record 1330 of the newest registration date and time is left, and the other records 1330 are removed from the objects of the calculation of the processing capacity.

Further, if the CPU utilization is other than 60-80% for all the records 1330 having the same computer ID, the same application ID and the same module ID and thus all the records 1330 do not remain as the result of filtering, then the processing capacity to be registered in the field 1344 when the CPU utilization is 60-80% is estimated for those records having the same computer ID, the same application ID and the same module ID. For example, the record 1330 whose CPU utilization is closest to 60-80% is specified. And, a ratio of the CPU utilization to the number of processed requests of the specified record 1330 is used to calculate the number of requests that will be processed when the CPU utilization becomes 60-80% (for example, 70%). Then, the CPU utilization of that record 1330 is changed to 60-80% (for example, 70%) and the number of processed requests is changed to the above-calculated value to generate a record 1330. The generated record 1330 is added to the list of the records 1330 that have been left after the filtering.

Next, for each record 1330 that has been left after the filtering of S122, the processing capacity calculation part 122 searches the resource management TL 132 for a record 1320 that has the same computer ID, the same application ID and the same module ID as the record 1330 in question. Then, the processing capacity calculation part 122 associates the specification information registered in the field 1322 of the retrieved record 1320 with the record 1330 in question (S123). Then, the processing capacity calculation part 122 classifies the records 1330 that have been left after the filtering of S122 according to set of the specification information (a combination of CPU name, CPU frequency and Memory capacity). Then, for each set of specification information, the processing capacity calculation part 122 obtains the average number of processed requests for the records 1330 with which that set of specification information is associated (S124).

Next, the processing capacity calculation part 122 notes specification information that has not been noted, out of sets of specification information associated with the records 1330 that have been left after the filtering of S122 (S125). Then, the processing capacity calculation part 122 judges whether the processing capacity management TL 134 has a record 1340 that registers the noted specification information and the application ID and the module ID of the noted record 1310 (S126). If such a record 1340 exists (YES in S126), the processing capacity registered in the field 1344 of that record 1340 is updated to the average number (calculated in S124) of processed requests (S127). On the other hand, if such a record 1340 does not exist (NO in S126), a new record 1340 is added to the processing capacity management TL 134, and the noted specification information and the application ID and the module ID of the noted record 1310 and the average number (calculated in S124) of processed requests are registered into the added record 1340 (S128).

When the processing capacity calculation part 122 has noted all the sets of specification information associated with the records 1330 that have been left after the filtering of S122

(YES in S129), then the processing capacity calculation part 122 notifies the required resource amount estimation part 123 of the noted record 1310, and ends the processing. Otherwise (NO in S129), the flow returns to S125.

Returning to FIG. 7, the description will be continued. Receiving the noted record 1310, the required resource amount estimation part 123 judges whether the resources (server computers 3) are deficient for the module PG having the module ID registered in the noted record 1310 (S13).

In detail, the required resource amount estimation part 123 searches the metric information management TL 133 for records having the application ID and the module ID of the noted record 1310. Next, the retrieved records 1330 are classified according to computer ID, to select the newest record 1330 for each computer ID. Then, the required resource amount estimation part 123 calculates the average of CPU utilization registered in the subfield 13343 of the records 1330 selected for the respective computer IDs, and investigates whether the average exceeds a given threshold (for example, 80%) or not, to judge whether the resources for the module PG having the module ID in question are deficient. If the resources are deficient (YES in S13), the flow proceeds to S14. On the other hand, if the resources are not deficient, the flow proceeds to S17.

In S14, with respect to the noted record 1310 received, the required resource amount estimation part 123 uses the metric information management TL 133 to estimate the amount of deficient resources for the module PG having the module ID registered in the noted record 1310.

Figure 9:
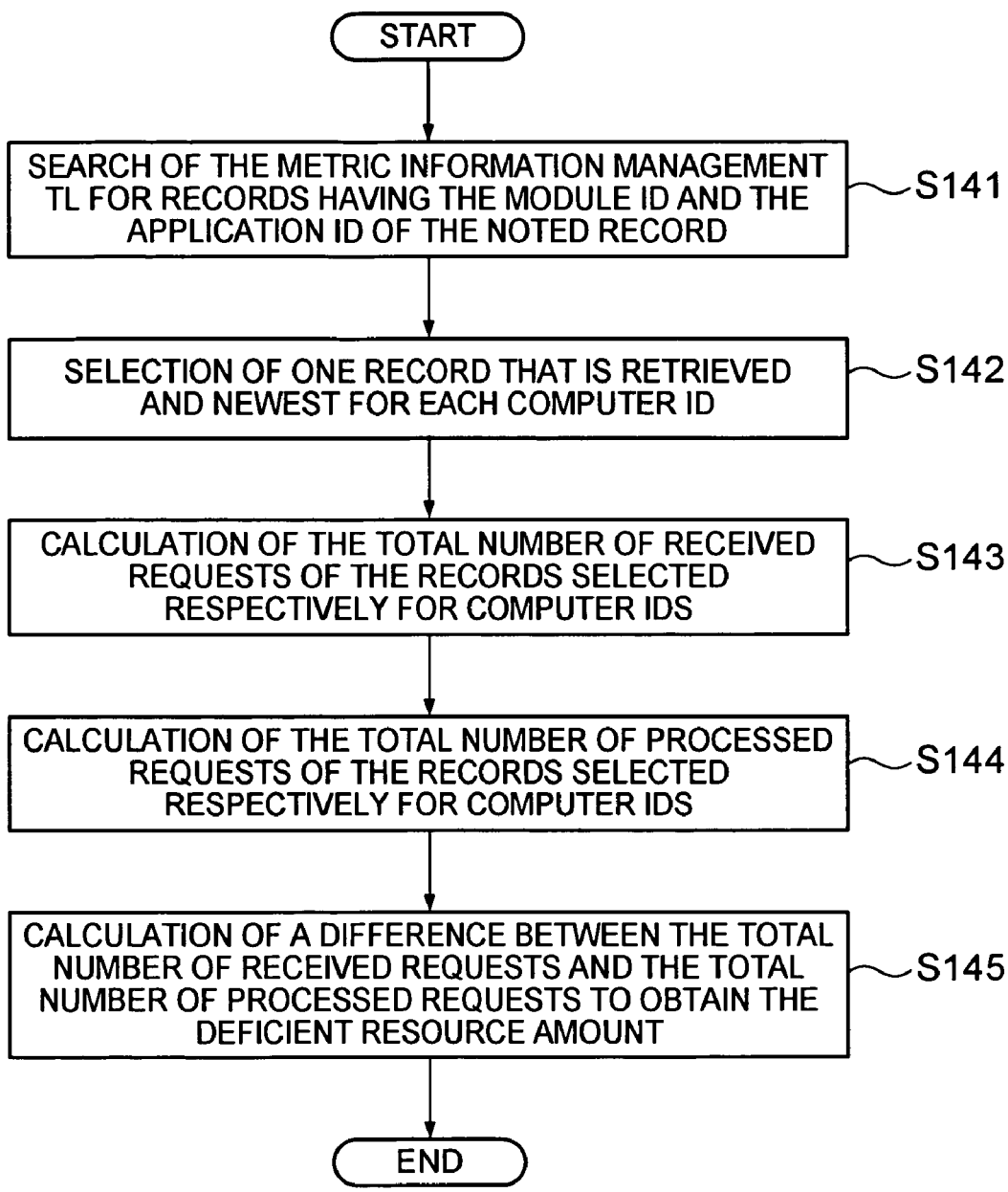
FIG. 9 is a flowchart for explaining operation in S14 (required resource amount estimation process) of FIG. 7.

FIG. 9 is a flowchart for explaining the operation in S14 (required resource amount estimation process) of FIG. 7.

First, the required resource amount estimation part 123 detects records 1330 having the application ID and the module ID of the noted record 1310 from the metric information management TL 133 (S141). Next, the required resource amount estimation part 123 classifies the detected records 1330 according to computer ID and selects the newest record 1330 for each computer ID (S142). Next, the required resource amount estimation part 123 calculates the total sum of the numbers of received requests, each number being registered in the subfield 13341 of the newest record 1330 selected for a computer ID (S143). Similarly, the required resource amount estimation part 123 calculates the total sum of the numbers of processed requests, each number being registered in the subfield 13342 of the newest record 1330 selected for a computer ID (S144). Then, the required resource amount estimation part 123 calculates the deficient resource amount, i.e., a difference between the total sum of the numbers (calculated in S143) of received requests and the total sum of the numbers (calculated in S144) of processed requests (S145). Then, the required resource amount estimation part 123 notifies the configuration change instruction part 124 of the noted record 1310 and the calculated value of the deficient resource amount.

Returning to FIG. 7, the description will be continued. Receiving the noted record 1310 and the calculated value of the deficient resource amount from the required resource amount estimation part 123, the configuration change instruction part 124 refers to the resource management TL 132 and the processing capacity management TL 134 to select server computers 3 to be assigned additionally to the module PG having the module ID of the noted record 1310 out of the pooled server computers 3 (S15).

Figure 10:
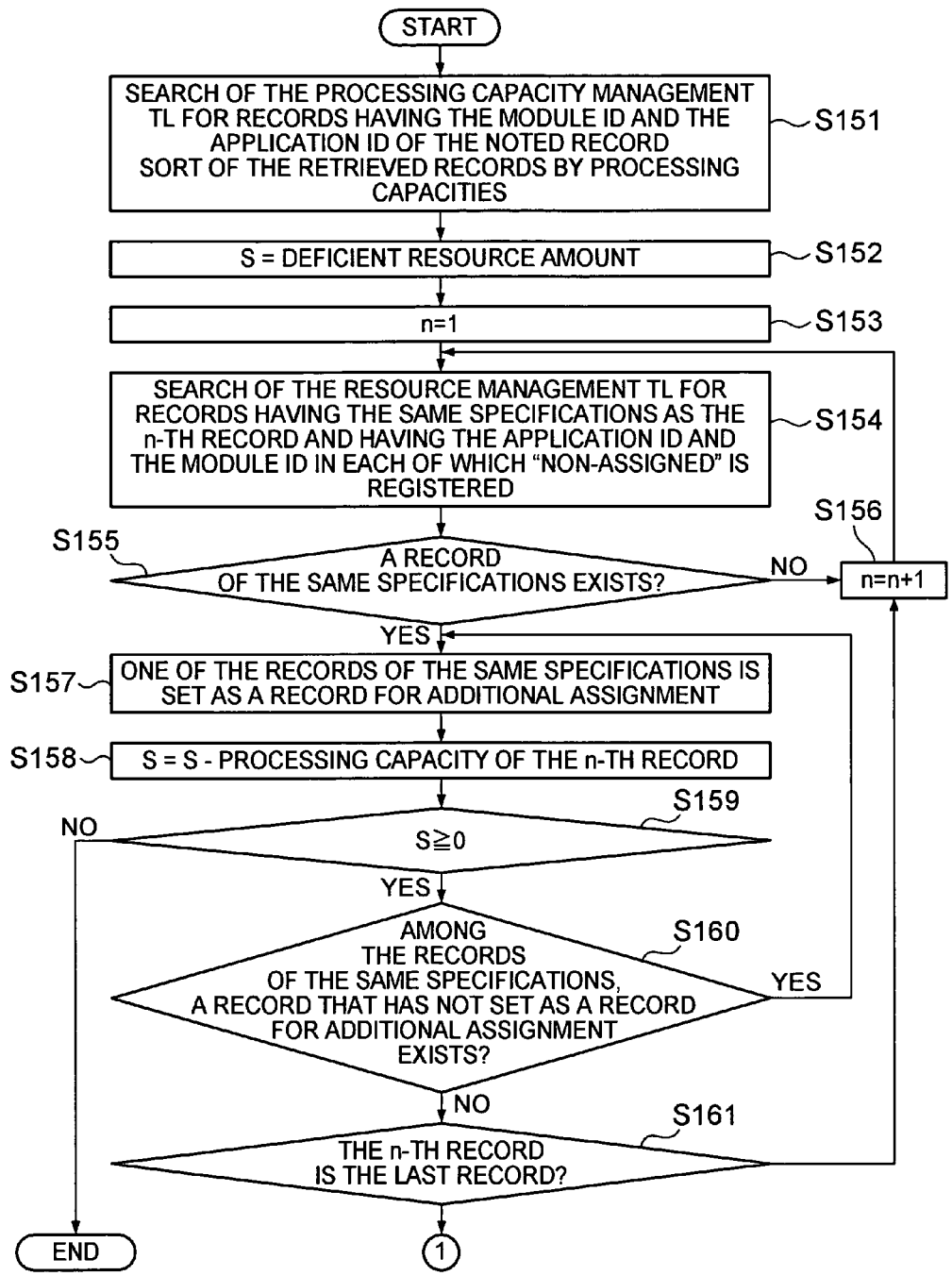
FIG. 10 is a flowchart for explaining operation in S15 (configuration change process) of FIG. 7.
Figure 11:
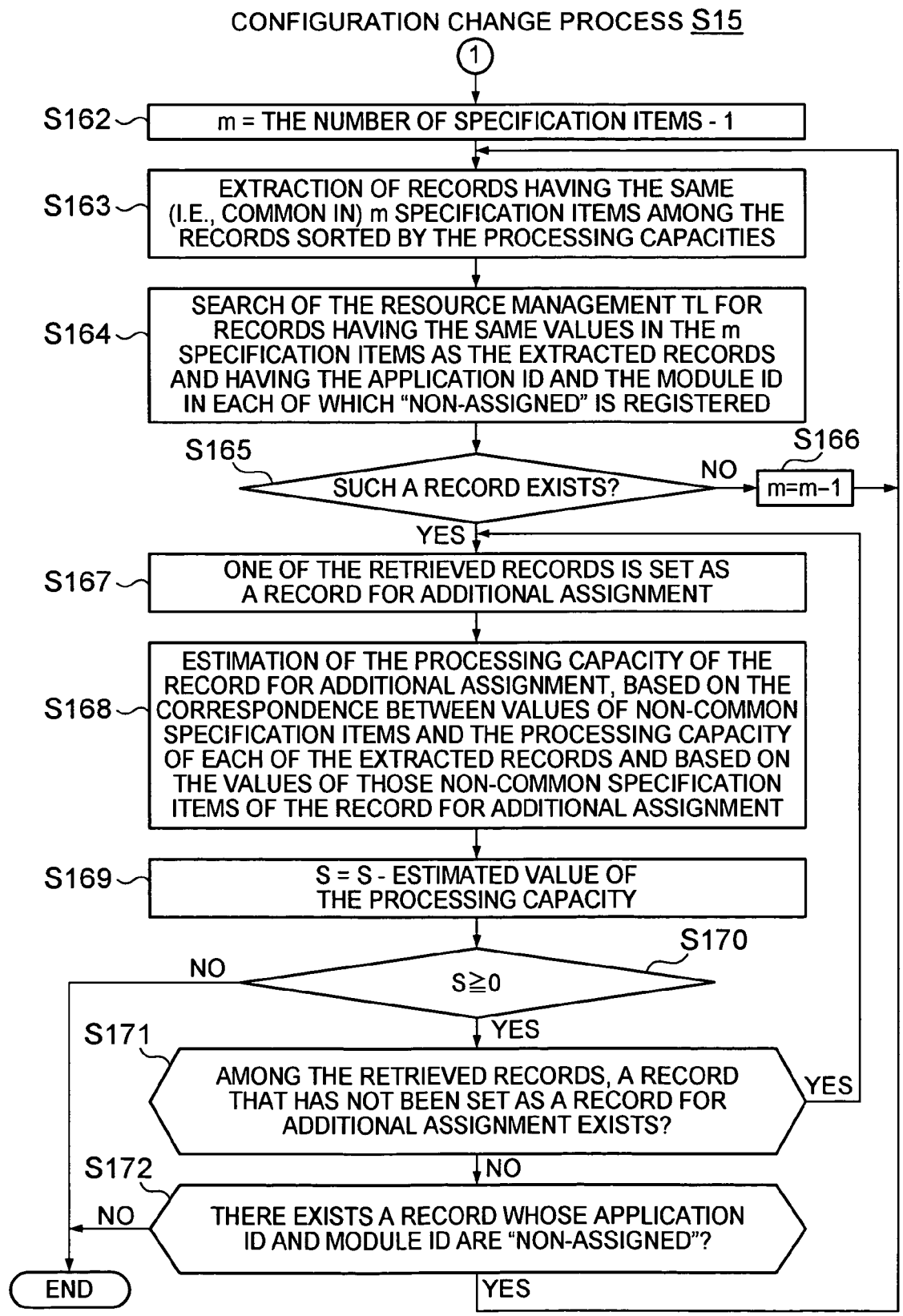
FIG. 11 is a flowchart for explaining operation in S15 (configuration change process) of FIG. 7.

FIGS. 10 and 11 are flowcharts for explaining the operation in S15 (configuration change process) of FIG. 7.

First, the configuration change instruction part 124 selects server computers 3 to be assigned additionally to the module PG having the module ID of the noted record 1310 out of the server computers 3 whose processing capacities are known (S151-S161).

The configuration change instruction part 124 extracts records 1340 having the application ID and the module ID registered in the noted record 1310 from the processing capacity management TL 134, and sorts the extracted records 1340 by processing capacities in descending order (S151).

Next, the configuration change instruction part 124 sets a variable S to the deficient resource amount estimated in the required resource amount estimation process S14 (S152). Further, a count value n is set to 1 (S153).

Then, the configuration change instruction part 124 searches the resource management TL 132 for records 1320 that have the same specification information as the n-th record 1340 in the list of the records 1340 sorted in S151 and that have application ID and module ID both set to "non-assigned" (S154). For example, if the n-th record 1340 has the specification information indicating the CPU name "A", the CPU frequency 3000 [MHz] and the Memory capacity 1024 [Mbyte], then three records 1320a-1320c are retrieved from the resource management TL 1320 shown in FIG. 3.

If no record 1320 can be retrieved in S154 (NO in S155), the count value n is incremented by one (S156) and the flow returns to S154.

On the other hand, if a record (records) 1320 can be retrieved in S154 (YES in S155), then the configuration change instruction part 124 selects a record 1320 that has not been set as a record for additional assignment out of the records retrieved by the search, and sets the selected record as a record for additional assignment. Then, with respect to this record for additional assignment, the configuration change instruction part 124 changes the application ID and the module ID (in which "non-assigned" is registered) of this record registered in the resource management TL 132 to the same application ID and the same module ID as the noted record 1310 (S157). Further, a flag indicating a record for additional assignment is set to this record 1320. Then, the configuration change instruction part 124 subtracts the processing capacity of the n-th record 1340 from the variable S and changes the variable S to the remainder (S158).

Next, the configuration change instruction part 124 judges whether the variable S is larger than or equal to a given threshold (for example, "0") (S159). If the variable S is less than the given threshold (NO in S159), then it is judged that resources (server computers 3) have been additionally assigned to the module PG having the module ID of the noted record 1310 to a degree that the resource deficiency can be settled, and this flow is ended. On the other hand, if the variable S is larger than or equal to the given threshold (YES in S159), then it is judged that resources (server computers 3) have not been additionally assigned to the module PG having the module ID of the noted record 1310 to a degree that the resource deficiency can be settled, and the flow moves to S160.

In S160, the configuration change instruction part 124 investigates whether there exists a record 1320 that has been retrieved by the search in S154 and that has not been set as a record for additional assignment. If there exists such a record 1320, the flow returns to S157. On the other hand, if there does not exist such a record 1320, then the configuration change instruction part 124 further investigates whether the n-th record 1340 is the last record 1340 in the list of the records sorted in S151 (S161). If the n-th record 1340 is not the last record 1340, then n is incremented by one (S156), and then the flow returns to S154.

On the other hand, if it is judged in S161 that the n-th record is the last record 1340, it means that the records 1320 for which "non-assigned" is registered in both the application ID and the module ID in the resource management TL 132 have different specification information from any record 1320 retrieved by the search in S154. Then, the configuration change instruction part 124 selects server computers 3 to be assigned additionally to the module PG having the module ID of the noted record 1310 out of server computers 3 whose processing capacities are unknown (S162-S172).

First, the configuration change instruction part 124 sets a count value m to the number of items in the specification information minus 1 (S162). In the case shown in FIGS. 3 and 5, the number of items in the specification information is three, i.e., CPU name, CPU frequency and Memory capacity, and thus it leads to m=2.

Next, in the list of the records 1340 sorted in S151, the configuration change instruction part 124 specifies m specification items in descending order of priorities previously given to respective items in the specification information, and extracts records 1340 that are same (common) in values of those m specification items (S163). In the present embodiment, the priorities are given in the order of CPU name, Memory capacity and CPU frequency. Accordingly, in the case of m=2, records 1340 having the same CPU name and the same Memory capacity are extracted. For example, in FIG. 5, when the records having the application ID "APP_01" and the module ID "WEB_01" are extracted from the processing capacity management TL 134 and sorted by the processing capacities in descending order, then two records 1340 having common CPU name "A" and Memory capacity "1024 [Mbyte]" and different CPU frequencies "866 [MHz]" and "2200 [MHz]" are extracted.

Next, the configuration change instruction part 124 searches the resource management TL 132 for records 1320 for which the m specification items (in descending order of the priorities given in advance to the respective items in the specification information) have the same values as the values of the corresponding specification items of the records 1340 extracted in S163 while both the application ID and the module ID are "non-assigned" (S164) If such a record or records 1340 can be extracted (YES in S165), the flow proceeds to S167. If such a record 1340 can not be extracted (NO in S165), the count value m is decremented by one (S166), and the flow returns to S163.

In S167, the configuration change instruction part 124 selects a record 1320 that has not been set as a record for additional assignment out of the records 1320 extracted in S164, and sets the selected record 1320 as a record for additional assignment. Then, the configuration change instruction part 124 changes the application ID and the module ID (in which "non-assigned" is registered) of this record for additional assignment in the resource management TL to the same application ID and the same module ID as the noted record 1310 (S167). Further, the flag indicating a record for additional assignment is set to this record 1320.

Then, using the correspondence between the specification information and the processing capacity of each record 1340 extracted in S163, the configuration change instruction part 124 estimates the processing capacity of the server computer 3 having the computer ID of the record 1320 for additional assignment (S168).

In detail, the processing capacity of the server computer 3 having the computer ID of the record 1320 for additional assignment is estimated as follows. Namely, first, the records 1340 extracted in S163 and the record 1320 for additional assignment are sorted by specifications in descending order.

For example, a score is determined in advance for each CPU name. Further, coefficients a1 and a2 are determined in advance respectively for CPU frequency and Memory capacity. Then, for each of the records 1340 extracted in S163 and the record 1320 for additional assignment, a score corresponding to CPU name, a score obtained by multiplying CPU frequency by the coefficient a1, and a score obtained by multiplying Memory capacity by the coefficient a2 are added to obtain the total score, and these records 1340 and 1320 are sorted by the total score in descending order.

Next, using at least one of the processing capacity of the record 1340 that is higher than the record 1320 for additional assignment by one rank and the processing capacity of the record 1340 that is lower than the record 1320 for additional assignment by one rank, the processing capacity of the server computer 3 having the computer ID of the record 1320 for additional assignment is estimated.

For example, the processing capacity of the server computer 3 having the computer ID of the record 1320 for additional assignment is determined as an average of the processing capacity of the record 1340 that is higher than the record 1320 for additional assignment by one rank and the processing capacity of the record 1340 that is lower than the record 1320 for additional assignment by one rank. If there does not exist a record 1340 that is higher than the record 1320 for additional assignment by one rank, then the processing capacity of the server computer 3 having the computer ID of the record 1320 for additional assignment is determined as the processing capacity of the record 1340 that is lower than the record 1320 for additional assignment by one rank. Further, if there does not exist a record 1340 that is lower than the record 1320 for additional assignment by one rank, then the processing capacity of the record 1340 of the server computer 3 having the computer ID of the record 1320 for additional assignment is determined as the processing capacity of the record 1340 that is higher than the record 1320 for additional assignment by one rank.

Or, using the above-mentioned total score and the processing capacity of the record 1340 that is higher than the record 1320 for additional assignment by one rank and the total score and the processing capacity of the record 1340 that is lower than the record 1320 for additional assignment by one rank, a linear function indicating correspondence between the total score and the processing capacity is calculated. If there does not exist a record 1340 that is higher than the record 1320 for additional assignment by one rank, then the total score and the processing capacity of the record 1340 that is lower than the record 1320 for additional assignment by one rank and the total score and the processing capacity of the record 1340 that is lower than the record 1320 for additional assignment by two ranks are used to calculate a linear function indicating correspondence between the total score and the processing capacity. Further, if there does not exist a record 1340 that is lower than the record 1320 for additional assignment by one rank, then the total score and the processing capacity of the record 1340 that is higher than the record 1320 for additional assignment by one rank and the total score and the processing capacity of the record 1340 that is higher than the record 1320 for additional assignment by two ranks are used to calculate a linear function indicating correspondence between the total score and the processing capacity. Then, the total score of the record 1330 for additional assignment is obtained, and the obtained total score is substituted into the linear function. The result of the substitution is determined as the processing capacity of the server computer 3 having the computer ID of the record 1320 for additional assignment.

Or, using at least one of the processing capacity of the record 1340 that is higher than the record 1320 for additional assignment by one rank and the processing capacity of the record 1340 that is lower than the record 1320 for additional assignment by one rank, processing capacity per unit of frequency is calculated. Then, multiplying the calculated processing capacity per unit of frequency by the CPU frequency of the record 1320 for additional assignment, the processing capacity of the server computer 3 having the computer ID of the record 1320 for additional assignment is calculated.

For example, it is assumed that the specification information of the record 1320 for additional assignment indicates the CPU name "A", the CPU frequency 1500 [MHz] and the Memory capacity 1024 [Mbyte], the specification information of the record 1340 that is higher than the record 1320 for additional assignment by one rank indicates the CPU name "A", the CPU frequency 2200 [MHz] and the Memory capacity 1024 [Mbyte] and the specification information of the record 1340 that is lower than the record 1320 for additional assignment by one rank indicates the CPU name "A", the CPU frequency 866 [MHz] and the Memory capacity 1024 [Mbyte] . Then, by dividing the CPU frequency 2200 [MHz] into the processing capacity 600 [the number of requests/minute] of the record 1340 that is higher than the record 1320 for additional assignment by one rank, the processing capacity per unit of frequency (1 [MHz]) is calculated at 0.2727. Similarly, by dividing the CPU frequency 886 [MHz] into the processing capacity 400 [the number of requests/minute] of the record 1340 that is lower than the record 1320 for additional assignment by one rank, the processing capacity per unit of frequency (1 [MHz]) is calculated at 0.4618. Then, the average 0.3673 of 0.2727 and 0.4618 is determined as the processing capacity per unit of frequency (1 [MHz]) of the server computer 3 having the computer ID of the record 1320 for additional assignment. Multiplying 0.3673 by the CPU frequency 1500 [MHz] of the server computer 3 in question, the processing capacity 550 [the number of requests/minute] of the server computer 3 in question is obtained.

Now, having estimated the processing capacity of the server computer 3 having the computer ID of the record 1320 for additional assignment, the configuration change instruction part 124 changes the variable S to the value of this variable S minus the estimated value of the processing capacity (S169).

Next, the configuration change instruction part 124 judges whether the variable S is larger than or equal to a given threshold (for example "0") (S170). If the variable S is less than the given threshold (NO in S170), then it is judged that resources (server computers 3) have been additionally assigned to the module PG having the module ID of the noted record 1310 to a degree that the resource deficiency can be settled, and this flow is ended. On the other hand, if the variable S is larger than or equal to the given threshold (YES in S170), then it is judged that resources (server computers 3) have not been additionally assigned to the module PG having the module ID of the noted record 1310 to a degree that the resource deficiency can be settled, and the flow moves to S171.

In S171, the configuration change instruction part 124 investigates whether there exists a record 1320 that has been retrieved by the search in S164 and that has not been set as a record for additional assignment. If there exists such a record 1320, the flow returns to S167. On the other hand, if there does not exist such a record 1320, then the configuration change instruction part 124 further investigates whether there remains a record 1320 whose application ID and module ID are "non-assigned" in the resource management TL 132 (S172). If there remains such a record 1320, the flow returns to S163. On the other hand, if there does not exist such a record 1320, this flow is ended.

Returning to FIG. 7, the description will be continued. When the processing in the configuration change instruction part 124 is ended, then the module distribution/setting part 125 distributes the module PG having the module ID of the noted record 1310 to the newly-assigned server computers 3 (resources) and changes the setting of the load balancer 2 so that those server computer 3 can be used (S16).

Figure 12:
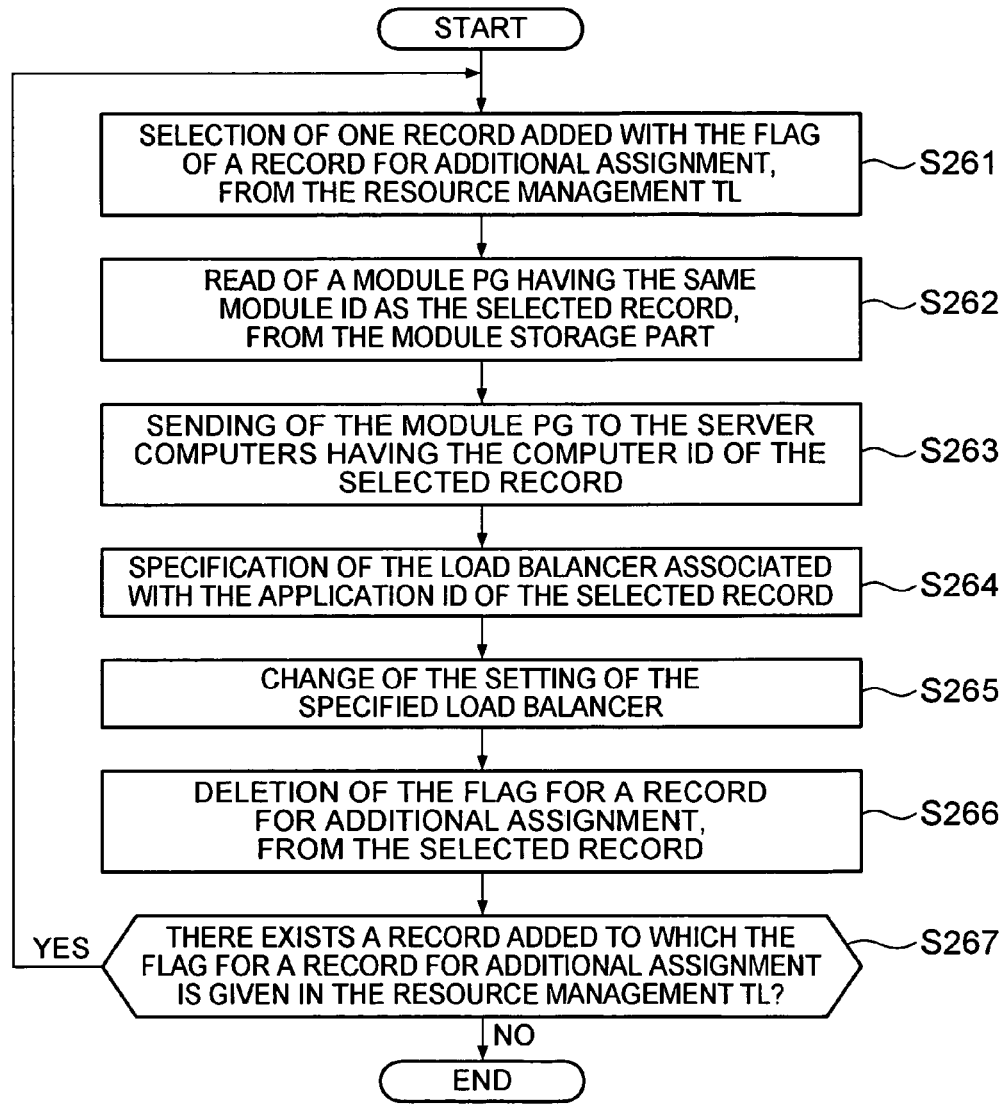
FIG. 12 is a flowchart for explaining operation in S16 (software module distribution/setting process) of FIG. 7.

FIG. 12 is a flowchart for explaining the operation in S16 (software module distribution/setting process) of FIG. 7.

First, the module distribution/setting part 125 selects one record 1320 to which the flag indicating a record for additional assignment is added in the configuration change process S15, out of the resource management TL 132 (S261). Then, the module distribution/setting part 125 reads the module PG specified by the application ID and the module ID of the selected record 1320 from the module storage part 135 (S262), and sends the module PG to the server computer 3 specified by the computer ID of the selected record 1320 through the management network 6 (S263). As a result, the installer 33 of the server computer 3 installs the module PG received from the resource assignment manager 1 into its own server computer 3, to make the module execution part 34 execute the module PG.

Next, the module distribution/setting part 125 specifies the load balancer ID registered in the load balancer management TL 136 being associated with the application ID of the record 1320 selected in S261 (S264), and accesses the load balancer 2 having the specified load balancer ID through the management network. Then, the computer ID of the server computer 3 to which the module PG was sent in S263 is set into the resource management TL 21 of the load balancer 2, together with the module ID of the module PG (S265). Then, the module distribution/setting part 125 deletes the flag given to the selected record 1320 as a record for additional assignment (S266).

The module distribution/setting part 125 repeats the above processes S261-S265 until the resource management TL 132 has no record 1320 to which the flag indicating a record for additional assignment has been given in the configuration change process S15 (S267).

Returning to FIG. 7, the description will be continued. If the operation part 12 has noted all the records 1310 whose field 1315 registers "possible" with respect to multiplexing (YES in S17), the operation part 12 ends this flow. On the other hand, if there remains a record 1310 that has not been noted yet (NO in S17), then the flow returns to S11.

Hereinabove, one embodiment of the present invention has been described.

In this embodiment, with respect to a module PG for which processing does not catch up with requests, the resource assignment manager 1 estimates the number of processable requests expected when the module PG is executed with each set of specifications of the pooled server computers 3, based on the correspondence between a set of specifications of a server computer 3 and the number of processable requests that can be expected when the module PG is executed by a server computer 3 having that set of specifications. Then, with respect to that module PG, the deficient resource amount is calculated as the number of requests corresponding to a difference between the number of received requests and the number of processed requests. And, at least one server computer 3 that is used for processing the deficient resource amount is determined out of the pooled server computers 3, based on the number of processable requests that can be expected for each of the pooled server computers 3. As a result, according to the present embodiment, it is possible to manage computers assigned to each application so as to prevent lowering of the service level of each application.

The present invention is not limited to the above embodiment, and can be variously modified within the scope of the invention.

For example, in the above embodiment, the configuration change instruction part 124 estimates the processing capacity of a server computer 3 whose processing capacity is not known with respect to a module PG deficient in resources, based on the processing capacities of the server computers 3 whose processing capacities are known with respect to that module PG. However, the present invention is not limited to this. It is possible, for each type of application, to store previously a specification conversion TL 137 that registers correspondence between the processing capacity of a server computer 3 with respect to execution of a representative benchmark program and the specification information of that server computer 3. Then, the specification conversion TL 137 is used to estimate the processing capacity of a server computer 3 whose processing capacity is not known with respect to a module PG deficient in resources.

FIG. 13 is a schematic diagram showing the specification conversion TL 137. As shown in the figure, the specification conversion TL 137 registers a record 1370 for each combination of a benchmark PG and a set of specifications of a server computer 3. Each record 1370 comprises a field 1371 for registering a service type of an application as an object of a benchmark PG, a field 1372 for registering a bench ID as identification information of that benchmark PG, a field 1373 for registering specification information (CPU name, CPU frequency and Memory capacity) of a server computer 3 on which the benchmark PG is executed, and a field 1374 for registering a result (i.e., processing capacity) of the benchmark PG on that server computer 3.

Figure 14:
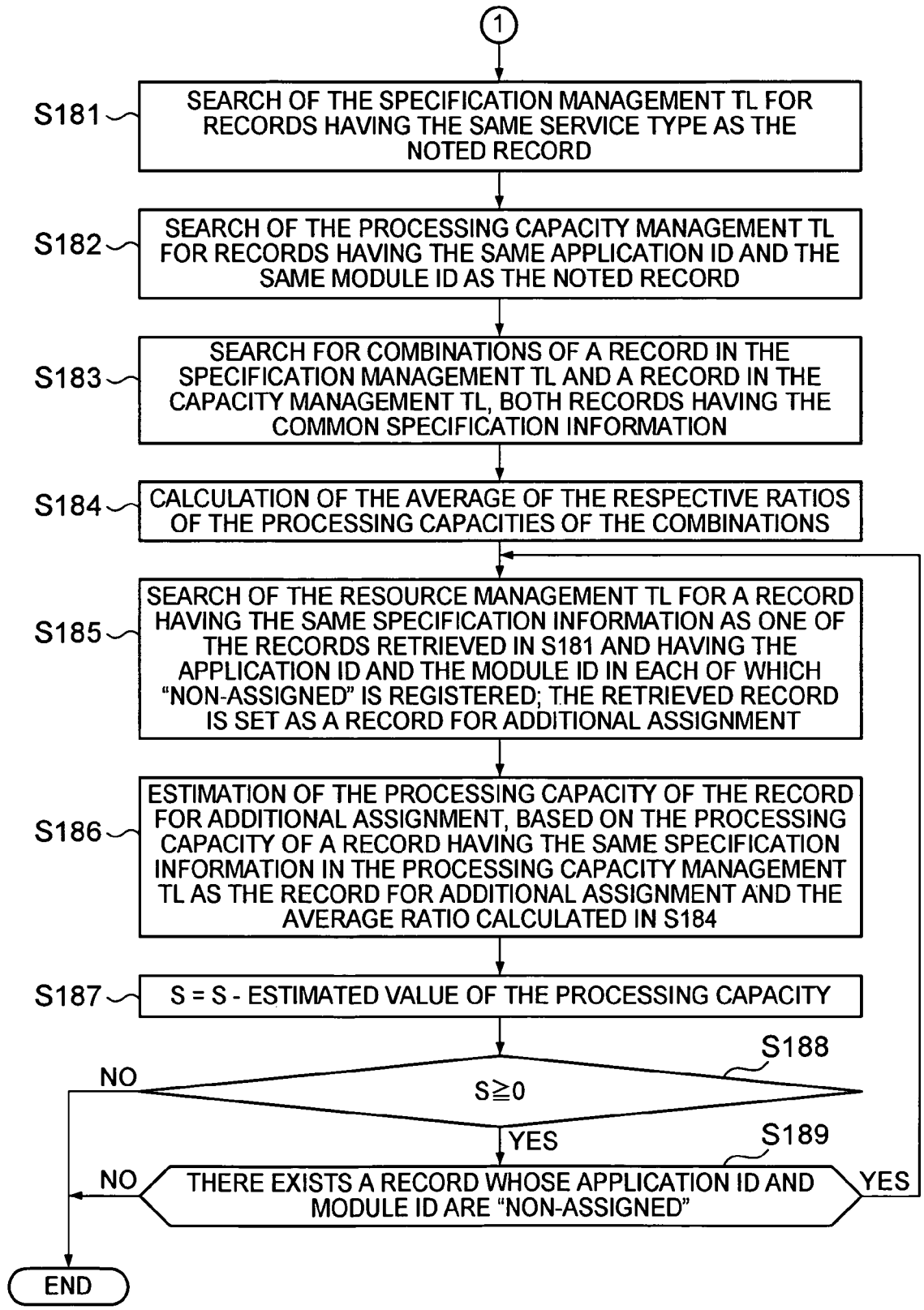
FIG. 14 is a flowchart for explaining a variant of a process (corresponding to S162-S172 of FIG. 11) of selecting server computers 3 that are additionally assigned to a module PG having the module ID of a noted record 1310 out of server computers 3 whose processing capacities are unknown, in S15 (configuration change process) of FIG. 7.

FIG. 14 is a flowchart for explaining a variant of the process (corresponding to S162-S172 of FIG. 11) of selecting server computers 3 that are additionally assigned to a module PG having the module ID of a noted record 1310 out of server computers 3 whose processing capacities are unknown, in S15 (the configuration change process) of FIG. 7.

The configuration change instruction part 124 extracts records 1370 having the same service type as the noted record 1310 from the specification conversion TL 1370 (S181). Further, the configuration change instruction part 124 extracts records 1340 having the same application ID and the same module ID as the noted record 1310 from the processing capacity management TL 134 (S182). Next, the configuration change instruction part 124 searches the records 1370 extracted in S181 and the records 1430 extracted in S182 for combinations of a record 137 and a record 140 having the same specification information (CPU name, CPU frequency and Memory capacity) (S183). Then, for each retrieved combination, the configuration change instruction part 124 calculates a ratio of the processing capacity of the record 1370 and the processing capacity of the record 1430, and obtains the average of the calculated ratios (S184). For example, in FIG. 5, the WEB shopping module PG (the application ID "APP_01" and the module ID "WEB_01") with the CPU name "A", the CPU frequency 866 [MHz] and the Memory capacity 1024 [Mbyte] has the processing capacity 300 (the number of requests/minute), while, in FIG. 13, the WEB shopping benchmark PG (AAA) with the CPU name "A", the CPU frequency 866 [MHz] and the Memory capacity 1024 [Mbyte] has the processing capacity 700 (the number of requests/minute) Accordingly, in this case, the ratio becomes 300/700=0.428.

Then, the configuration change instruction part 124 specifies a record 1320 that has the same specification information as one of the records 1370 extracted in S181 and that has the application ID and the module ID in which "non-assigned" is registered, and sets the specified record 1320 as a record for additional assignment (S185). Then, the configuration change instruction part 124 changes the application ID and the module ID (in which "non-assigned" is registered) of the record for additional assignment in the resource management TL 132 to the same application ID and the same module ID as the noted record 1310. Further, the flag indicating a record for additional assignment is given to this record 1320.

Next, the configuration change instruction part 124 calculates the processing capacity of the server computer 3 having the computer ID of the record for additional assignment, by multiplying the processing capacity of the record 1370 having the same specification information as the record 1320 for additional assignment by the average ratio calculated in S184 (S186).

Having estimated the processing capacity of the server computer 3 having the computer ID of the record 1320 for additional assignment, the configuration change instruction part 124 changes the variable S to the variable S minus this estimated value (S187).

Next, the configuration change instruction part 124 judges whether the variable S is larger than or equal to a given threshold (for example, "0") (S188). If the variable S is less than the given threshold (NO in S188), then it is judged that resources (server computers 3) have been additionally assigned to the module PG having the module ID of the noted record 1310 to a degree that the resource deficiency can be settled, and this flow is ended. On the other hand, if the variable S is larger than or equal to the given threshold (YES in S188), then it is judged that resources (server computers 3) have not been additionally assigned to the module PG having the module ID of the noted record 1310 to a degree that the resource deficiency can be settled, and the flow moves to S189.

In S189, the configuration change instruction part 124 investigates whether there remains a record 1320 whose application ID and module ID register "non-assigned" in the resource management TL 132. If there remains such a record 1320, the flow returns to S185. If there does not remain such a record 1320, this flow is ended.

Further, in the above embodiment, the required resource amount estimation part 123 calculates the required resource amount, using the metric information management TL 133. However, the present invention is not limited to this. It is possible to obtain the number of received requests and the number of processed requests from each load balancer 2 for each module PG, to calculate the required resource amount for each module PG.

Further, in the above embodiment, the management network 5 and the application network 6 are provided separately. However, one network may be used as both the management network and the application network.

First, in the above embodiment, the resource assignment manager 1 distributes a module PG to server computers 3. However, it is possible that each server computer 3 stores module PGs in advance and the installer 33 installs a module PG designated by the resource assignment manager 1 to make the module execution part 34 execute the designated module PG.

Further, in the above embodiment, the deficient resource amount is calculated as a difference between the total number of received requests, which is calculated in S143 (FIG. 9), and the total number of processed requests, which is calculated in S144 (S145). However, the present invention is not limited to this, and the deficient resource amount may be defined as a difference between the total number of received requests and the processing capacity of the current configuration. Namely, the deficient resource amount may be defined as a difference between the total number of received requests (which is calculated in S143) and the value of the processing capacity registered in the field 1344 of the currently-used resources.

Having described the preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

The invention claimed is:

1. A resource assignment manager that determines computers on which an application is newly executed out of pooled computers, adopted in a system in which each of a plurality of applications is executed on at least one of a plurality of computers and requests to an application are distributed to and processed by computers on which said application is executed, comprising:
    a resource information storage means, which stores specification information of each computer;
    a processing capacity storage means, which stores, for each of said plurality of applications, correspondence between specification information of a computer and a number of processed requests per unit of time, said number being expected if the application in question is executed on a computer having said specification information;
    a required resource amount estimation means, which specifies, for each of said plurality of applications, an application deficient in resources based on a difference between a number of received requests per unit of time and a number of processed requests per unit of time in each of computers assigned to the application in question, and calculates said difference in number of requests as a required resource amount for said application specified as one deficient in resources; and
    a configuration change means, which determines computers required for processing the required resource amount estimated by said required resource amount estimation means, out of said pooled computers, based on the specification information, stored in said resource information storage means, of each of said pooled computers, the specification information of a computer stored in said processing capacity storage means, and the correspondence between the specification information of the computer and the number of processed requests per unit of time, said number being expected if the specified application deficient in resources is executed on the computer having said specification information.

2. A resource assignment manager according to claim 1, wherein:
    said configuration change means calculates a number of processed requests per unit of time, which can be expected when said specified application is executed on each of said pooled computers, based on the specification information, stored in said resource information storage means, of each of said pooled computers, the specification information of a computer stored in said processing capacity storage means, and the correspondence between the specification information of the computer and the number of processed requests per unit of time, said number being expected if the specified application deficient in resources is executed on the computer having said specification information; and then said configuration change means determines at least one computer out of said pooled computers such that a number of processed requests per unit of time, which is expected when said application is executed on said at least one computer determined, becomes more than or equal to the number of requests corresponding to the required resource amount estimated by said required resource amount estimation means.

3. A resource assignment manager according to claim 2, wherein:
    with respect to specification information of a computer of said pooled computers, which is stored in said resource information storage means, when said processing capacity storage means stores the number of processed requests per unit of time, said number being expected if said specified application deficient in resource is executed on a computer having said specification information, then said configuration change means calculates said stored number of processed requests as said number of processed requests per unit of time, which can be expected if said specified application deficient in responses is executed on said computer of the pooled computers.

4. A resource assignment manager according to claim 2, wherein:
    with respect to specification information of a computer of said pooled computers, which is stored in said resource information storage means, when said processing capacity storage means does not store the number of processed requests per unit of time, said number being expected if said specified application deficient in resource is executed on a computer having said specification information, then said configuration change means searches said processing capacity storage means for a number of processed requests per unit of time, which can be expected when said specified application deficient in resources is executed on a computer having specification information approximate to the specification information in question, and uses a retrieved number of processed requests to calculate the number of processed requests per unit of time, which can be expected if said specified application deficient in resources is executed on the computer of said pooled computers.

5. A resource assignment manager according to claim 3, wherein:
    with respect to specification information of a computer of said pooled computers, which is stored in said resource information storage means, when said processing capacity storage means does not store the number of processed requests per unit of time, said number being expected if said specified application deficient in resource is executed on a computer having said specification information, then said configuration change means searches said processing capacity storage means for a number of processed requests per unit of time, which can be expected when said specified application deficient in resources is executed on a computer having specification information approximate to the specification information in question, and uses a retrieved number of processed requests to calculate the number of processed requests per unit of time, which can be expected if said specified application deficient in resources is executed on the computer of said pooled computers.

6. A resource assignment manager according to claim 2, wherein:
said resource assignment manager further comprises a specification conversion information storage means, which stores, for each of said plurality of applications, correspondence between specification information of a computer and a number of processed requests per unit of time, said number being expected when a benchmark program of a same kind as the application in question is executed on a computer having said specification information; and
with respect to specification information of a computer of said pooled computers, which is stored in said resource information storage means, when said processing capacity storage means does not store the number of processed requests per unit of time, said number being expected if said specified application deficient in resource is executed on a computer having said specification information, then said configuration change means searches said specification conversion information storage means for a number of processed requests per unit of time, which is obtained when a benchmark program of a same kind as said specified application deficient in resources is executed, and uses a retrieved number of processed requests and specification information corresponding to said number of processed request to calculate the number of processed requests per unit of time, which can be expected if said specified application deficient in resources is executed on the computer of said pooled computers.

7. A resource assignment manager according to claim 3, said resource assignment manager further comprises a specification conversion information storage means, which stores, for each of said plurality of applications, correspondence between specification information of a computer and a number of processed requests per unit of time, said number being expected when a benchmark program of a same kind as the application in question is executed on a computer having said specification information; and
with respect to specification information of a computer of said pooled computers, which is stored in said resource information storage means, when said processing capacity storage means does not store the number of processed requests per unit of time, said number being expected if said specified application deficient in resource is executed on a computer having said specification information, then said configuration change means searches said specification conversion information storage means for a number of processed requests per unit of time, which is obtained when a benchmark program of a same kind as said specified application deficient in resources is executed, and uses a retrieved number of processed requests and specification information corresponding to said number of processed request to calculate the number of processed requests per unit of time, which can be expected if said specified application deficient in resources is executed on the computer of said pooled computers.

8. A resource assignment manager according to claim 1, further comprising:
a metric information collection means, which collects metric information that includes information on a number of processed requests per unit of time, from each of computers on which an application is executed; and a processing capacity calculation means, which stores, for each of said plurality of applications, specification information, which is stored in said resource information storage means, of each of computers on which the application in question is executed, in association with the number of processed requests, the number is included in the metric information collected by said metric information collection means from each of said computers on which the application in question is executed, into said processing capacity storage means.

9. A resource assignment manager according to claim 2, further comprising:
a metric information collection means, which collects metric information that includes information on a number of processed requests per unit of time, from each of computers on which an application is executed; and
a processing capacity calculation means, which stores, for each of said plurality of applications, specification information, which is stored in said resource information storage means, of each of computers on which the application in question is executed, in association with the number of processed requests, the number is included in the metric information collected by said metric information collection means from each of said computers on which the application in question is executed, into said processing capacity storage means.

10. A resource assignment manager according to claim 6, further comprising:
a metric information collection means, which collects metric information that includes information on a number of processed requests per unit of time, from each of computers on which an application is executed; and
a processing capacity calculation means, which stores, for each of said plurality of applications, specification information, which is stored in said resource information storage means, of each of computers on which the application in question is executed, in association with the number of processed requests, the number is included in the metric information collected by said metric information collection means from each of said computers on which the application in question is executed, into said processing capacity storage means.

11. A resource assignment manager according to claim 1, wherein said configuration change means further comprising:
an application distribution means, which sends said specified application deficient in resources to said determined computers to make said determined computers execute said application.

12. A resource assignment manager according to claim 2, wherein said configuration change means further comprising:
an application distribution means, which sends said specified application deficient in resources to said determined computers to make said determined computers execute said application.

13. A resource assignment manager according to claim 6, wherein said configuration change means further comprising:
an application distribution means, which sends said specified application deficient in resources to said determined computers to make said determined computers execute said application.

14. A resource assignment manager according to claim 8, wherein said configuration change means further comprising:
an application distribution means, which sends said specified application deficient in resources to said determined computers to make said determined computers execute said application.

15. A resource assignment management system comprising:
- a resource assignment manager according to claim 1;
- a plurality of computers; and
- load balancers, each of which distributes requests to an application to computers on which said application is executed out of said plurality of computers, so that said requests are processed by said computers to which said requests are distributed.

16. A resource assignment management system comprising:
- a resource assignment manager according to claim 2;
- a plurality of computers; and
- load balancers, each of which distributes requests to an application to computers on which said application is executed out of said plurality of computers, so that said requests are processed by said computers to which said requests are distributed.

17. A resource assignment management system comprising:
- a resource assignment manager according to claim 6;
- a plurality of computers; and
- load balancers, each of which distributes requests to an application to computers on which said application is executed out of said plurality of computers, so that said requests are processed by said computers to which said requests are distributed.

18. A resource assignment management system comprising:
- a resource assignment manager according to claim 8;
- a plurality of computers; and
- load balancers, each of which distributes requests to an application to computers on which said application is executed out of said plurality of computers, so that said requests are processed by said computers to which said requests are distributed.

19. A resource assignment management system comprising:
- a resource assignment manager according to claim 11;
- a plurality of computers; and
- load balancers, each of which distributes requests to an application to computers on which said application is executed out of said plurality of computers, so that said requests are processed by said computers to which said requests are distributed.

20. A resource assigning method in which a resource assignment manager determines computers on which an application is newly executed out of pooled computers, adopted in a system in which each of a plurality of applications is executed on at least one of a plurality of computers and requests to an application are distributed to and processed by computers on which said application is executed, wherein:

a storage unit of said resource assignment manager memorizes:

a resource information management table that stores specification information of each computer; and a processing capacity management table that stores, for each of said plurality of applications, correspondence between specification information of a computer and a number of processed requests per unit of time, said number being expected if the application in question is executed on a computer having said specification information;

an operation unit of said resource assignment manager performs:

a step, in which, for each of said plurality of applications, an application deficient in resources is specified based on a difference between a number of received requests per unit of time and a number of processed requests per unit of time in each of computers assigned to the application in question, and said difference in number of requests is determined as a required resource amount for said application specified as one deficient in resources; and a step, in which computers required for processing said determined required resource amount are determined out of said pooled computers, based on the specification information stored in said resource information management table of each of said pooled computers, the specification information of a computer stored in said processing capacity management table, and the correspondence between the specification information of the computer and the number of processed requests per unit of time, said number being expected if the specified application deficient in resources is executed on the computer having said specification information.

* * * * *